Sept. 23, 1952  H. D. DIGNEY  2,611,323
PUMP
Filed Nov. 30, 1948

HAROLD D. DIGNEY Inventor

By Cushman, Darby & Cushman

Patented Sept. 23, 1952

2,611,323

UNITED STATES PATENT OFFICE 2,611,323

PUMP

Harold D. Digney, Syracuse, N. Y.

Application November 30, 1948, Serial No. 62,718

3 Claims. (Cl. 103—126)

This invention relates to self-lubricating pumps for handling corrosive fluids.

In the past, considerable difficulty has been experienced when pumping corrosive fluids due to the contamination of the fluids by the pump lubricant and the chemical action of the fluids on the pump elements. This chemical action also results in rapid deterioration of the pump elements. In general, parts of similar material do not wear well when run together, and parts of dissimilar corrosion resistant materials require careful lubrication.

I have discovered that the objections above-related are overcome by mounting the pump elements which are made of corrosion resistant material so that they move over a surface of self-lubricating carbon, e. g., graphite impregnated carbon such as "graphitar" which is formed from a mixture of carbon and graphite powders, the mixture being compacted under high unit pressures and furnaced at temperatures exceeding 3000° F. In this manner, the use of lubricating oils and liquid lubricants is avoided.

The primary object of this invention is to furnish a pump which will avoid the need for lubricating oil or liquid lubricant and which may be used to pump such products as milk, fruit and vegetable juices and other products in which contamination would be objectionable.

Another object of the invention is to furnish a pump having a housing provided with a lining or solid body of corrosion resistant self-lubricating material which is secured firmly in the housing. The housing may be made of aluminum, or other metal or plastic, by casting the material around five sides of the solid body forming the lining.

A further object of the invention is to furnish a gear pump having all working parts made of stainless steel or other corrosion resistant material completely incased in the corrosion resistant self-lubricating lining.

An additional object is to furnish a pump with the inlet and outlet connections secured to the housing and made of corrosion resistant material, the connections being held tightly against the lining.

A still further object is to furnish a pump with the drive shaft passing through a bushing of corrosion resistant material held tightly against the lining and also secured to the housing, the bushing being provided with a shaft sealing means.

These and other objects of the invention will become apparent from the accompanying drawings taken in conjunction with the following specification in which I have, for purposes of illustration, shown the invention applied to a gear pump.

Referring to the drawings.

Figure 1:
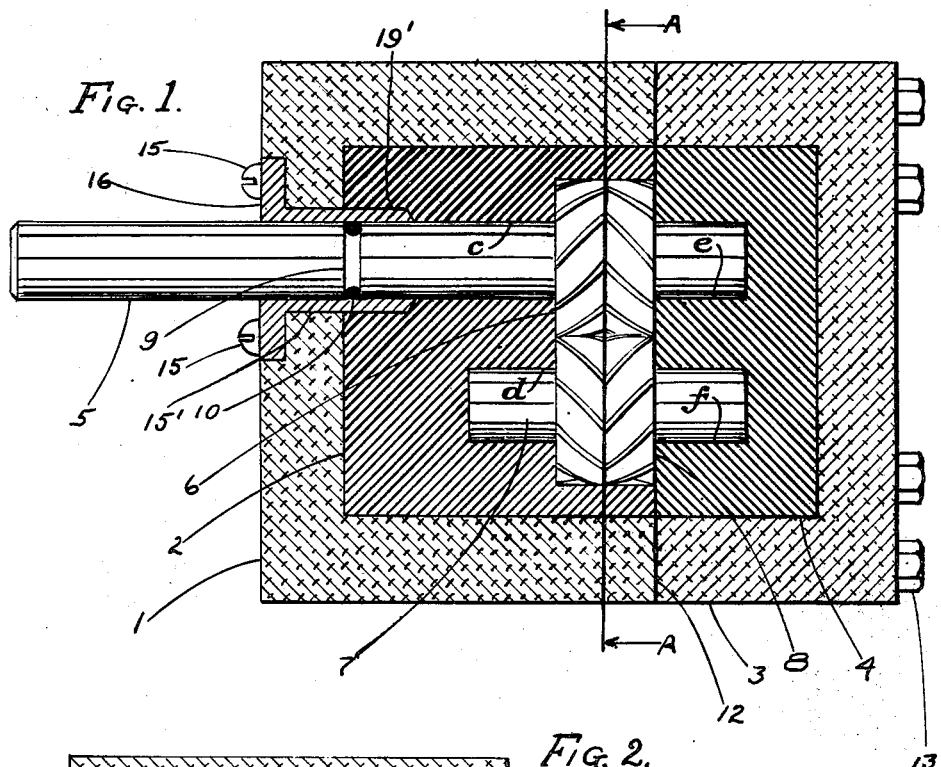
Figure 1 is a cross section of one embodiment of this invention.

In these figures like numerals designate similar parts, the housing being formed in sections 1 and 3, each of which is completely filled with a body or block of self-lubricating carbon 2 and 4, respectively, of the character above-described. This lining or body is held securely in the housing by casting the housing sections around five sides of each solid block of the lining material, the sections 1—3 containing the blocks 2—4 being assembled and secured together after mounting of the pump elements therein. For this purpose the housing sections 1—3 and the linings 2—4 are machined to take the shafts 5 and 7, gears 6 and 8, bushing 16, and connections 18. As shown, when the sections are assembled and aligned, a recess is provided in the assembled carbon body enclosing the gears 6 and 8 in which they may rotate and forming bearings for the shafts 5 and 7 whereby said gears may be rotated within the carbon body. This recess includes the enlarged gear housing or pump chamber a with which communicate the relatively smaller fluid passages or openings b and the pump shaft bearing or opening c and pump shaft bearing d, all formed in the block 2, and the pump shaft bearings e and f communicating with the pump chamber a formed in the block 4. The fit of the gears in the pump chamber a of the recess is made as snug as possible. The drive shaft 5 passes through bushing 16 and is sealed by the O ring 10, preferably of relatively soft natural or synthetic rubber, in groove 9 of the shaft, or by any other corrosion resistant sealing means or by seating the ring 10 in a groove in the bushing 16. Bushing 16 is secured by the screws 15 in the opening 15' of the housing section 1, and extends through this opening in the housing, as shown. It will be noted that the bushing 16 extends into the shaft opening c of the recess in the adjacent carbon body 2 and about the shaft 5. In this manner a sealed connection is provided and the bushing fits tightly with the adjacent wall of the passage c of the recess in the block 2 in which it is seated, as shown at 19'.

Figure 2:
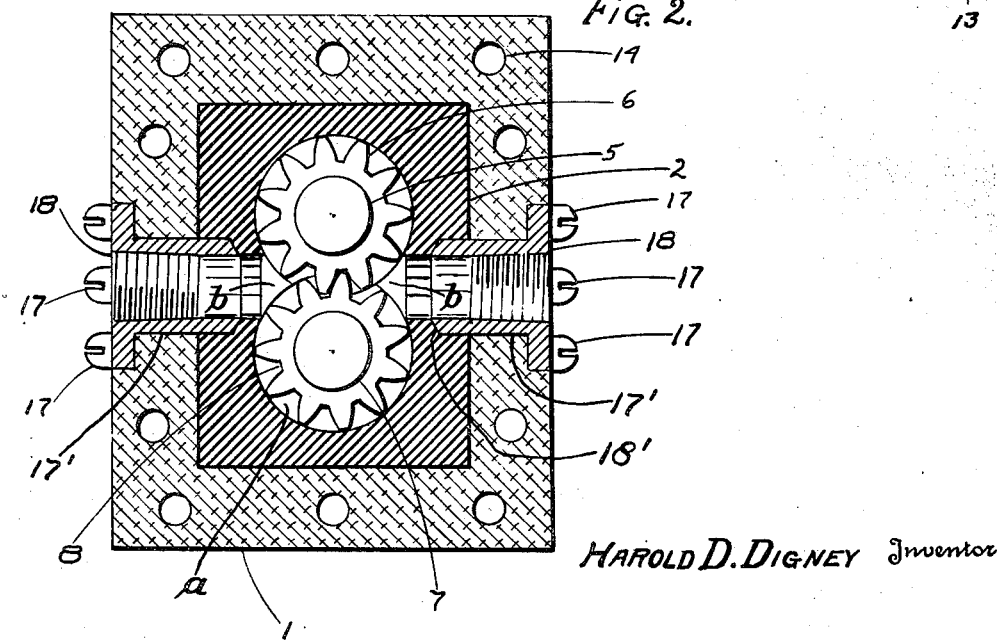
Figure 2 is a section taken along the line A—A of Figure 1.

Referring to Figure 2, the inlet and outlet sleeves or connections 18 for the fluid being pumped are secured in openings 17' in the housing section 1 by screws 17 and respectively extend into aligned openings b in the adjacent carbon body 2 to form an effective seal. Here also, the sleeves 18 have a tight fit with the adjacent wall of the openings b in the block in which they are seated to form a sealed connection. Preferably, the inner ends of the sleeves 18 terminate back from the gears, as shown at 18' so as to obtain a better seal and avoid the possibility of interference with the rotation of the gears.

As shown in Figure 1, gears 6 and 8 are completely encased in the chamber a in the carbon body or lining 2—4 and are held in operating position by the shafts 5 and 7, which are also held in position for rotation in the recess in the carbon body 2—4 by the bearings c, d, e and f. I have designated the pump element receiving portions of the carbon block 2—4 as a single recess in which, as explained, are rotatably mounted the gears 6 and 8, and the shafts 5 and 7.

Since the inlet and outlet connections 18, gears 6 and 8, shafts 5 and 7, shaft bushing 16, and shaft seal 10 are all made of corrosion resistant material, the corrosive fluid contacts only corrosion resistant materials. As no liquid lubricant is required for the shafts the pump cannot contaminate the fluids with any harmful or chemically active material.

As noted above, the housing is formed by casting aluminum or other comparatively low melting metal or plastic around at least five sides of the heat resistant lining or block thereby forming the sections 1—2 and 3—4. The contracting of the metal or plastic on cooling compresses the core 2—4 in all directions, i. e., on all five sides, providing a perfect bond without fracturing the core. It is then possible to machine, e. g., bore the body and housing of these sections resulting in a stress relief depending on the size and depth of the bore. The sections are connected together by bolts 13 and preferably a gasket 12 is interposed between the assembled sections. Preferably, the section 2 of the carbon block or lining is machined to provide a recess which will receive the gears 6 and 8 and their shafts on one side of the gears while the block 4 is machined to receive the shafts 5 and 7 of the gears on the other side of the gears. This is advantageous in that the block 4 then presents a flat surface to the gears which serves to prevent leakage. Moreover, the machining operation is conducted primarily on the block 2 and relatively little machining is required on the block 4 except to form the recess for receiving the ends of the shafts 5 and 7.

That portion of the recess in the solid self-lubricating carbon block 2—4 in which the gears 6 and 8 are disposed to rotate constitutes, as stated, the pump chamber, as will be appreciated, with which communicates the sealed passages 18, as above-described, for the entrance and discharge of fluid.

Preferably, the shafts 5 and 7, as well as the gears 6 and 8 on which the gears are mounted, and which are designated as the "pump elements," are polished smooth so as to obtain best results and increase the life of the pump.

I have illustrated the bushing 16 as countersunk in the housing 1 and this is preferred, but the bushing 16 may be disposed in the housing and in the adjacent carbon block in any manner which will form an effective seal. The same is true with respect to the connections 18.

It is to be understood, of course, that the shaft 5 is driven from any suitable means to rotate the pump elements and carry out the pumping function of this device.

I claim:

1. In a pump, a housing having opposed hollow inner sections, each section of the housing having abutting inner ends, means connecting the sections together, the hollow portions of each of said sections being completely filled with a solid body of self-lubricating carbon, the opposed faces of said bodies being in transverse alignment with their corresponding abutting inner ends of the housing sections, the inner face of one of said solid bodies being recessed and provided with spaced bearing openings, one of which openings has a closed outer end, the opposed inner face of the other solid body having spaced bearing openings having closed outer ends arranged to align with the spaced openings in the first mentioned body and to coact with said recess to form a closed chamber when the parts are assembled, pump elements including a pair of intermeshing gears positioned in said chamber and having shafts extending from opposite sides thereof into said bearing openings so as to be revolvably mounted therein, the section containing the gears and the solid body therein having aligned ports disposed on opposite sides of the pump elements and communicating with said chamber for entrance and discharge of fluid, and one of said shafts extending outwardly through the housing for connection with driving means for rotating the pump elements.

2. In a pump, a sectional hollow housing as called for in claim 1 in which sealing sleeves are connected to the housing and extend into the ports so as to tightly engage the surrounding walls of the solid bodies.

3. In a pump, a housing as called for in claim 1 made of cast aluminum.

HAROLD D. DIGNEY.

REFERENCES CITED

The following references are of record in the file of this patent:

UNITED STATES PATENTS

| Number | Name | Date |
|---|---|---|
| 564,269 | Bennett | July 21, 1896 |
| 1,739,139 | Haight | Dec. 10, 1929 |
| 1,970,146 | Hill | Aug. 14, 1934 |
| 2,202,913 | Johnson | June 4, 1940 |
| 2,484,789 | Hill et al. | Oct. 11, 1949 |

FOREIGN PATENTS

| Number | Country | Date |
|---|---|---|
| 1,392 | Great Britain | 1855 |
| 294,653 | Great Britain | June 6, 1929 |
| 459,468 | Great Britain | Jan. 8, 1937 |
| 548,998 | Great Britain | Nov. 2, 1942 |

OTHER REFERENCES

National Carbon Company Catalog, Section M-9110-A issued Nov. 1, 1946.

National Carbon Company Catalog, Section M-9100 issued 1944.